(12) United States Patent
Need et al.

(10) Patent No.: US 7,284,205 B2
(45) Date of Patent: *Oct. 16, 2007

(54) PROVIDING MULTIPLE INPUT BINDINGS ACROSS DEVICE CATEGORIES

(75) Inventors: Dwayne Need, Woodinville, WA (US); Gregory Cavanaugh Franklin, Kirkland, WA (US); Kevin B. Gjerstad, Kirkland, WA (US); Nicholas M. Kramer, Seattle, WA (US); Yutaka Nakajima, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

This patent is subject to a terminal disclaimer.

(21) Appl. No.: 10/717,189

(22) Filed: Nov. 18, 2003

(65) Prior Publication Data

US 2005/0104858 A1   May 19, 2005

(51) Int. Cl.
  *G06F 3/00*  (2006.01)
(52) U.S. Cl. .................... 715/764; 710/67; 719/313
(58) Field of Classification Search ................ 715/764; 719/313
  See application file for complete search history.

(56) References Cited

U.S. PATENT DOCUMENTS

| | | |
|---|---|---|
| 5,761,420 A | 6/1998 | Johnson et al. |
| 5,790,120 A | 8/1998 | Lozares et al. |
| 5,881,318 A | 3/1999 | Liebenow |
| 5,892,512 A | 4/1999 | Donnelly et al. |
| 5,973,688 A | 10/1999 | May |
| 6,167,455 A * | 12/2000 | Friedman et al. ........... 719/320 |
| 6,307,548 B1 | 10/2001 | Flinchem et al. |
| 6,313,854 B1 | 11/2001 | Gibson |
| 6,356,965 B1 | 3/2002 | Broyles et al. |
| 6,400,382 B1 | 6/2002 | Davis |
| 6,934,778 B2 | 8/2005 | Numano |
| 2005/0022165 A1 | 1/2005 | Ruff |

OTHER PUBLICATIONS

Berman, A., "Actions that live in Delphi," http://www.delphipages.com/news/detaildocs.cfm?ID=16, pp. 1-5 (Dec. 17, 1999).

Clemenzi, R., "Delphi User Interface Design Using Actions, Menus, and ToolBars," http://www.cpcug.org/user/clemenzi/technical/Languages/Delphi/UserInterfaceDesign.html, pp. 1-12 date unknown.

(Continued)

*Primary Examiner*—Stephen Hong
*Assistant Examiner*—Phenuel S Salomon
(74) *Attorney, Agent, or Firm*—Merchant & Gould P.C.

(57) ABSTRACT

A commanding system for a computer. The system includes an input module that accepts a plurality of input sequences across multiple input device categories, and a commanding element having a binding table that connects input sequences to associated action. One or more of the binding entries in the binding table includes a command binding with a plurality of sub-command bindings associated with the plurality of input sequences across multiple input device categories. A processor receives the input at the input module and passes the input to the command element, the command element looking up a matching command binding associated with the input in the binding table. In addition, the processor invokes action associated with the input if the matching binding is found in the binding table. The system can also report the commands a particular application can understand upon request.

7 Claims, 9 Drawing Sheets

OTHER PUBLICATIONS

Swart, B., "Dr. Bob on Delphi Actions and Action Lists," http://www.drbob42.com/delphi4/actions.htm, 5 pages (© 2000-2004).
"Command Targets," *Microsoft Corporation*, 1 page (© 2004).
"Mapping Messages," *Microsoft Corporation*, 1 page (© 2004).
"Message Categories," http://msdn.microsoft.com/library/en-us/vc-core/html/_core_message_categories.asp?frame=true, *Microsoft Corporation*, pp. 1-2 (© 2004).
"Messages and Commands in the Framework," *Microsoft Corporation*, 1 page (© 2004).
"Messages," *Microsoft Corporation*, 1 page (© 2004).
"Microsoft Foundation Class Library Development Guidelines," *Microsoft Corporation*, pp. 1-26 (© 1995-1996).
"TN071: MFC IOleCommandTarget Implementation," http://msdn.microsoft.com/library/en-us/vcmfc98/html/vccontn071mfciolecommandtargetimplementation.asp?frame=true, *Microsoft Corporation*, pp. 1-5 (© 2004).
"User-Interface Objects and Command IDs," http://msdn.Microsoft.com/library/en-us/vccore/html/_core_User.2d.Interface_Objects_and_Command_IDs.asp?frame=true, *Microsoft Corporation*, pp. 1-2 (© 2004).
"WM_APPCOMMAND Notification," http://msdn.microsoft.com/library/en-us/winui/WinUI/WindowsUserInterface/UserInput/KeyboardInput/KeyboardInputReference/Keyboar . . . , *Microsoft Corporation*, pp. 1-5 (© 2004).
"WM_COMMAND Notification," http://msdn.microsoft.com/library/en-us/winui/winui/windowsuserinterface/resources/menus/menureference/menumessages/wm_command . . . , *Microsoft Corporation*, pp. 1-2 (© 2004).

\* cited by examiner

PROVIDING MULTIPLE INPUT BINDINGS ACROSS DEVICE CATEGORIES

TECHNICAL FIELD

The present invention relates to commanding for a computer system and, more particularly, to providing multiple input bindings across device categories.

BACKGROUND

A commanding system allows a user's input to a computer system to be connected to an action performed by the computer in response to the input. One example of commanding is the connection of the input keystroke "ctrl-c" to the action of copying selected material to the clipboard. One existing commanding system is the Microsoft Foundation Class (MFC) Library. Commanding systems such as the MFC Library are implemented on an application-by-application basis. In other words, in existing commanding systems, commanding is handled by each application individually.

In addition, for a given application, commanding is handled on a device-dependent basis. In other words, in existing commanding systems, different sections of code are used to handle inputs based on the input device category (e.g., keyboard versus mouse versus menu) from which the input originates. For example, a specific section of code is used to connect an input sequence from a particular input device (e.g., a mouse) to a command handler that causes a specific action. However, a separate section of code is required to connect an input sequence from a different input device (e.g., a keyboard) to the specific action, even though the two inputs are used to invoke the same specific action.

Commanding has been structured such that different code sections handle the different inputs. Because different code sections are used, inconsistencies can result in how inputs across device categories are connected to actions.

SUMMARY

The present invention relates to commanding for a computer system and, more particularly, to providing multiple input bindings across device categories. A computer system is configured to include commanding information represented by a plurality of binding entries. One or more of the binding entries can include a plurality of command bindings that span multiple device categories.

In addition, commanding information for an application can be traversed and reported to identify the commands that an application recognizes.

One aspect of the invention is a commanding system for a computer, including a memory storing an input module that accepts a plurality of input sequences across multiple input device categories, and a commanding element having a binding table that connect input to associated action, at least one binding entry in the binding table including sub-command bindings associated with the plurality of input sequences across multiple input device categories. The system also includes a processor in data communication with the storage facility, the processor programmed to: receive the input at the input module, pass the input to the command element, the command element looking up a matching sub-command binding associated with the input in the binding table, and invoke action connected with the input if the matching sub-command binding is found in the binding table.

Another aspect of the invention is a computer readable medium having data structure stored thereon for use in commanding within a computing environment, the data structure including a first binding table for a first commanding element, the first binding table including a plurality of first binding entries, each binding entry of the plurality of first binding entries including a command binding, a command, and a handler, wherein at least a first command binding of one binding entry of the plurality of first bindings entries includes a plurality of sub-command bindings associated with a plurality of input sequences generated across multiple input device categories.

Yet another aspect of the invention is a method for commanding a computer system, including: receiving one of a plurality of input sequences generated by different input device categories, passing the input sequence to a commanding element, looking up a matching binding entry associated with the input sequence in a binding table, the matching binding entry including a plurality of sub-command bindings for the different input devices, and invoking a handler associated the input if the matching binding is found in the binding table.

BRIEF DESCRIPTION OF THE DRAWINGS

Reference will now be made to the accompanying drawings, which are not necessarily drawn to scale, and wherein.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

A computer system is configured to include commanding information represented by a plurality of binding entries. One or more of the binding entries includes a plurality of command bindings that span multiple device categories. In addition, commanding information for an application can be traversed and reported to identify the commands that an application recognizes.

Figure 1:
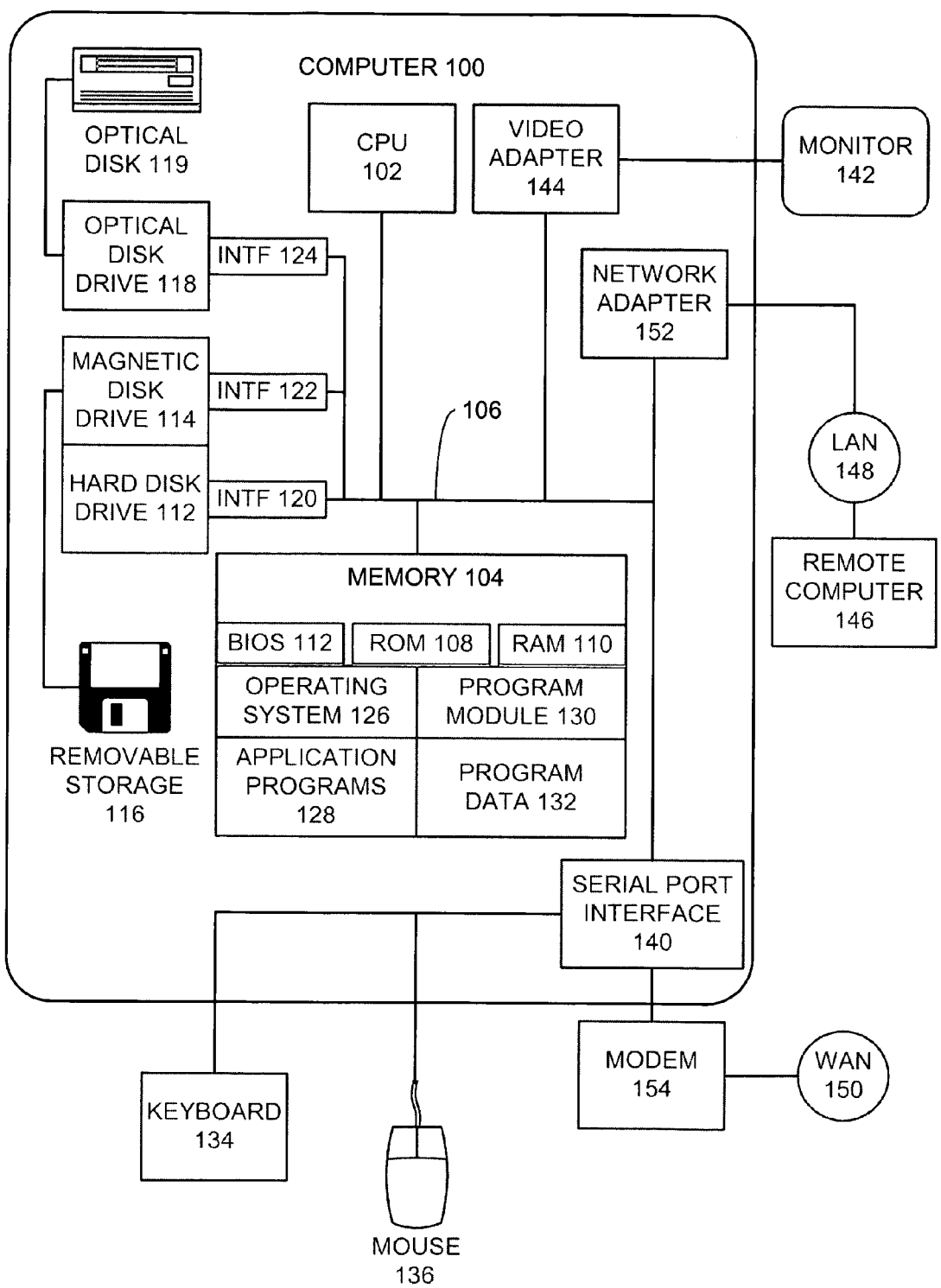
FIG. 1 illustrates an example general purpose computing system according to an embodiment of the present invention.

Referring now to FIG. 1, an example computer system 100 is illustrated. The computer system 100 illustrated in FIG. 1 can take a variety of forms such as, for example, a desktop computer, a laptop computer, and a hand-held computer. In addition, although computer system 100 is illustrated, commanding as disclosed herein can be implemented in various alternative computer systems as well.

The system 100 includes a processor unit 102, a system memory 104, and a system bus 106 that couples various system components including the system memory 104 to the processor unit 100. The system bus 106 can be any of several types of bus structures including a memory bus, a peripheral bus and a local bus using any of a variety of bus architectures. The system memory includes read only memory (ROM) 108 and random access memory (RAM) 110. A basic input/output system 112 (BIOS), which contains basic routines that help transfer information between elements within the computer system 100, is stored in ROM 108.

The computer system 100 further includes a hard disk drive 112 for reading from and writing to a hard disk, a magnetic disk drive 114 for reading from or writing to a removable magnetic disk 116, and an optical disk drive 118 for reading from or writing to a removable optical disk 119 such as a CD ROM, DVD, or other optical media. The hard disk drive 112, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, programs, and other data for the computer system 100.

Although the example environment described herein can employ a hard disk 112, a removable magnetic disk 116, and a removable optical disk 119, other types of computer-readable media capable of storing data can be used in the example system 100. Examples of these other types of computer-readable mediums that can be used in the example operating environment include magnetic cassettes, flash memory cards, digital video disks, Bernoulli cartridges, random access memories (RAMs), and read only memories (ROMs).

A number of program modules can be stored on the hard disk 112, magnetic disk 116, optical disk 119, ROM 108, or RAM 110, including an operating system 126, one or more application programs 128, other program modules 130, and program data 132.

A user may enter commands and information into the computer system 100 through input devices such as, for example, a keyboard 134, mouse 136, or other pointing device. Examples of other input devices include a toolbar, menu, touch screen, microphone, joystick, game pad, pen, satellite dish, and scanner. These and other input devices are often connected to the processing unit 102 through a serial port interface 140 that is coupled to the system bus 106. Nevertheless, these input devices also may be connected by other interfaces, such as a parallel port, game port, or a universal serial bus (USB). A liquid-crystal display (LCD) 142 or other type of display device is also connected to the system bus 106 via an interface, such as a video adapter 144. In addition to the display 142, computer systems can typically include other peripheral output devices (not shown), such as speakers and printers.

The computer system 100 may operate in a networked environment using logical connections to one or more remote computers, such as a remote computer 146. The remote computer 146 may be a computer system, a server, a router, a network PC, a peer device or other common network node, and typically includes many or all of the elements described above relative to the computer system 100. The network connections include a local area network (LAN) 148 and a wide area network (WAN) 150. Such networking environments are commonplace in offices, enterprise-wide computer networks, intranets, and the Internet.

When used in a LAN networking environment, the computer system 100 is connected to the local network 148 through a network interface or adapter 152. When used in a WAN networking environment, the computer system 100 typically includes a modem 154 or other means for establishing communications over the wide area network 150, such as the Internet. The modem 154, which can be internal or external, is connected to the system bus 106 via the serial port interface 140. In a networked environment, program modules depicted relative to the computer system 100, or portions thereof, may be stored in the remote memory storage device. It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 2:
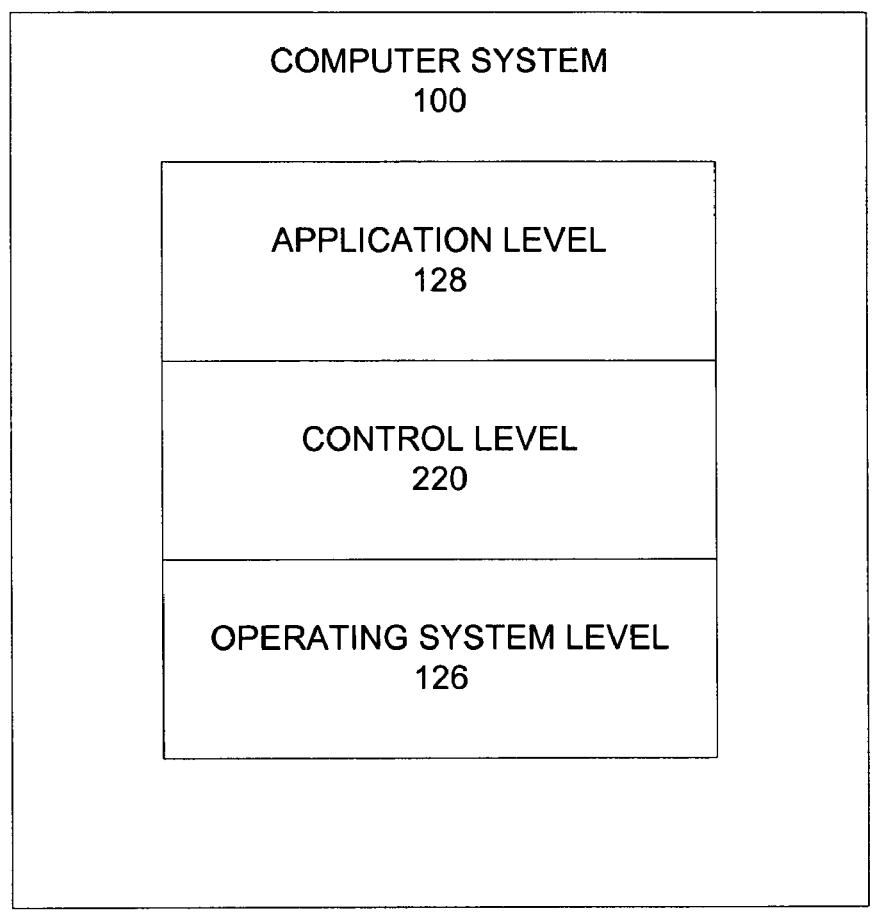
FIG. 2 illustrates an example computing environment of the computer system of FIG. 1.

Referring now to FIG. 2, an example computing environment for the computer system 100 is shown. The computer system 100 includes operating system level 126, which includes software that interfaces with the hardware components of the computer 100 and performs rudimentary tasks. At a higher level shown in FIG. 2, application level 128 of computer system 100 includes various applications designed to assist a user in performance of a specific task. A control level 220 (sometimes referred to as the user interface level) is logically positioned between the operating system level 126 and application level 128. The control level 220 includes software that manages various elements of a graphical user interface.

Figure 3:
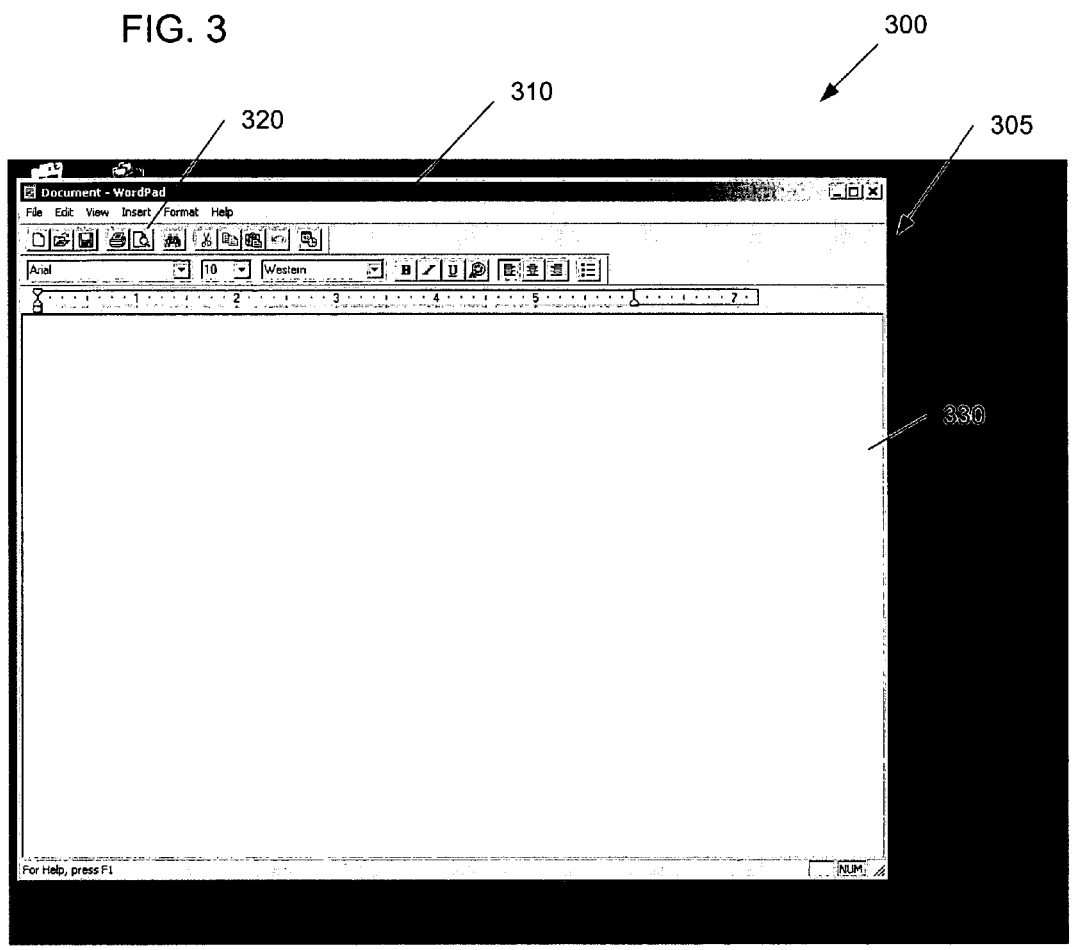
FIG. 3 illustrates an example operating environment for the computer system of FIG. 2.

Referring now to FIG. 3, an example user interface 300 for an application is provided. The example user interface 300 includes various control elements that are implemented at the control level. For example, the user interface 300 includes focus window 305, panel 310, button 320, and text box 330. The panel 310 is displayed in the focus window 305, and button 320 and text box 330 are displayed in panel 310.

The user interface illustrated in FIG. 3 is one example user interface, and various modifications can be made. For example and without limitation, the interface shown in FIG. 3 can be a user interface for the WordPad application, which is provided as an accessory application to various versions of MICROSOFT® WINDOWS® operating systems. In the illustrated embodiment, the focus window 305 is the window in which the application and control elements are shown. The panel 310 is positioned within the focus window 305. Likewise, button 320 and text box 330 are provided within the panel 310. For example, as shown, the button 320 is a button on a toolbar of the WordPad application, and the text box 330 is the portion of the panel 310 where a user inputs text.

The features of the user interface 300 illustrated in FIG. 3 (i.e., focus window 305, panel 310, button 320, and text box 330) can be logically represented as nodes of a hierarchical tree. For example, referring now to FIG. 4, an embodiment of a tree 400 is illustrated. Each node of the tree 400 (e.g., nodes 405, 410, 420, and 430) corresponds to a feature of the user interface 300 shown in FIG. 3. Specifically, the nodes of the tree 400 correspond to the features of the user interface 300 as follows:

- node 405 corresponds to focus window 305;
- node 410 corresponds to panel 310;
- node 420 corresponds to button 320; and
- node 430 corresponds to text box 330.

The nodes of the tree 400 are arranged in a hierarchical structure to represent the arrangement of the underlying features. In the example embodiment set forth herein, node 405, which logically represents focus window 305, is the parent to all other nodes in the tree 400 because all other features of the user interface fall within the focus window 305. Likewise, node 410, representing panel 310, is a descendant of node 405 because the panel 310 falls within the focus window 305. Similarly, nodes 420 and 430 represent button 320 and text box 330 within panel 310, which are on the same hierarchical level and are both descendants of node 410.

Figure 4:
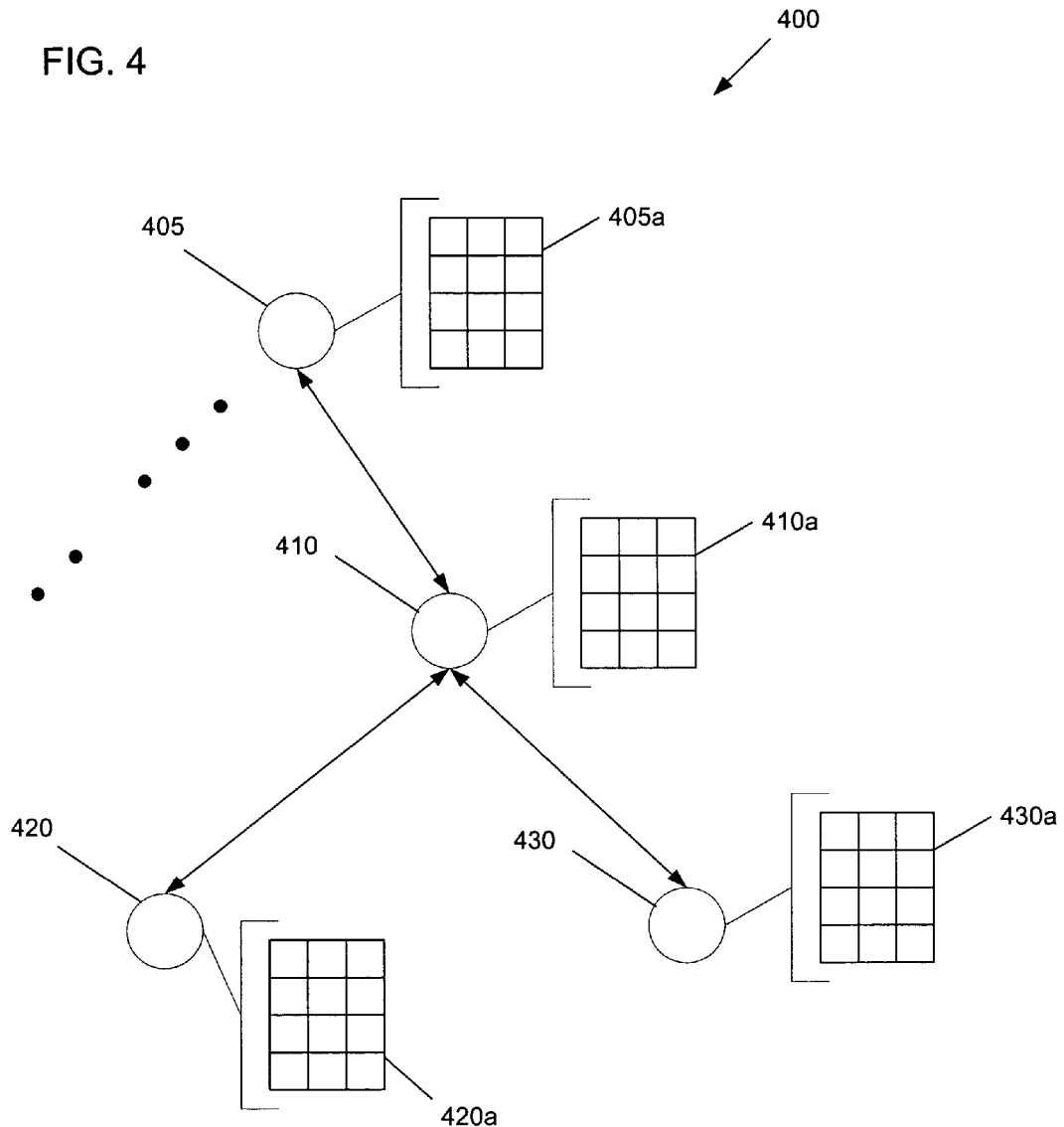
FIG. 4 illustrates an example hierarchical tree according to an embodiment of the present invention.

Each node of tree 400, can, but need not, be associated with a binding table. Generally, a binding table is a lookup table including a plurality of binding entries that connect inputs to actions. As illustrated in FIG. 4, node 405 is associated with binding table 405a. Likewise, nodes 410, 420, and 430 are associated with binding tables 410a, 420a, and 430a, respectively.

Figure 5:
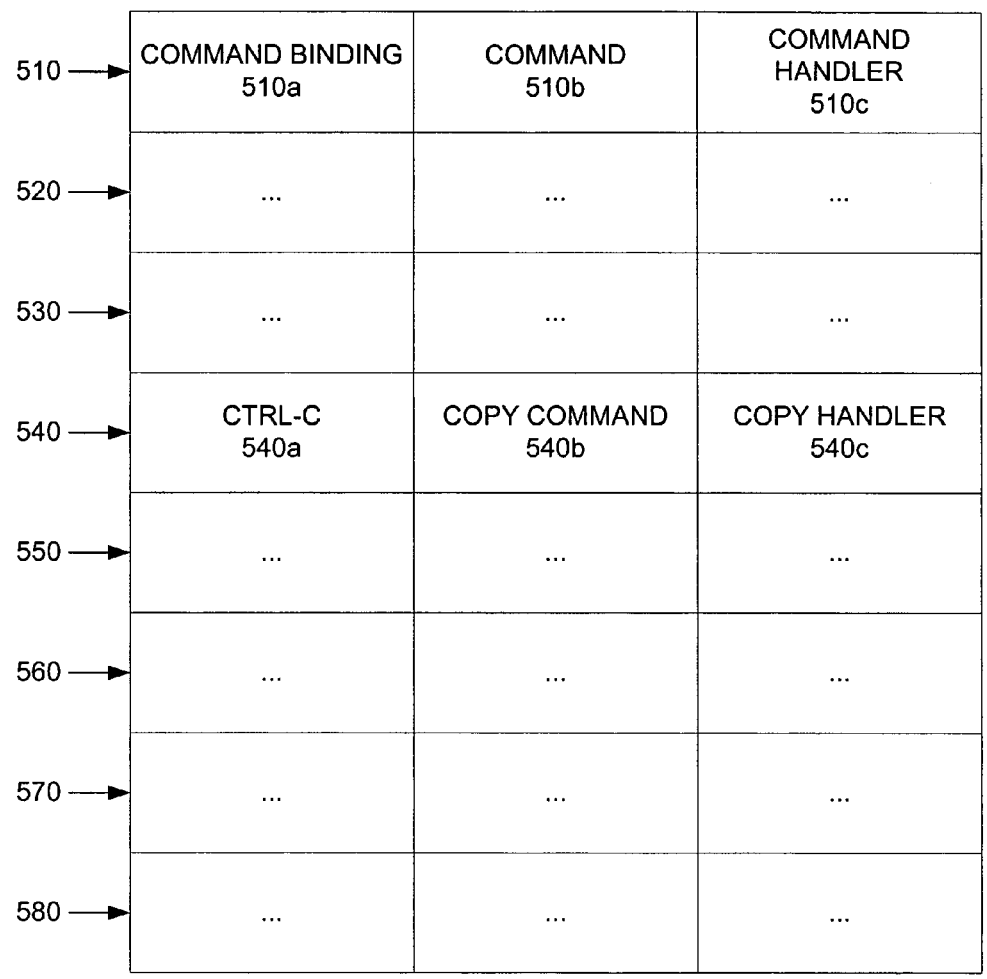
FIG. 5 illustrates an example binding table including a plurality of binding entries according to an embodiment of the present invention.

An example binding table 500 is illustrated in FIG. 5. The binding table 500 includes a plurality of binding entries 510, 520, 530, 540, 550, 560, 570, and 580. More or fewer binding entries also can be provided. Generally, each example binding entry of binding table 500 provides information that allows an action to be connected to an input that invokes the action. More specifically, binding entry 510 includes a command binding 510a, a command 510b, and a command handler 510c. The command binding 510a represents the input sequence (e.g., "ctrl-c") from an input device that is received by the computer system 100 and that is to be acted upon. The command 510b is a label that identifies the raw intent of the input sequence (e.g., "copy"). The command handler 510c is a pointer to a portion of code that is executed to implement the action that is to be performed based upon the input sequence.

For example, binding entry 540 shown in FIG. 5 is an entry in the binding table 500 for the "copy" command. The command binding 540a for binding entry 540 is the input sequence, in the illustrated case the keystroke, "ctrl-c." The command 540b is the label describing the intent of the input sequence, "copy." The command handler 540c is the object that is executed to actually implement the intent of the user, copying of selected material to the clipboard.

In one example embodiment, pseudo-code for implementing each entry of the binding table is as follows.

```
<CommandLink Command = copy
    key = "ctrl-c"
    invoke = copy_handler />
```

In this example "commandlink" structure, the "Command" defines the command (i.e., "copy," 540b), the key defines the command binding ("ctrl-c," 540a), and the invoke defines the command handler (i.e., "copy_handler," 540c). A series of these commandlinks can be listed to create a binding table.

Figure 6:
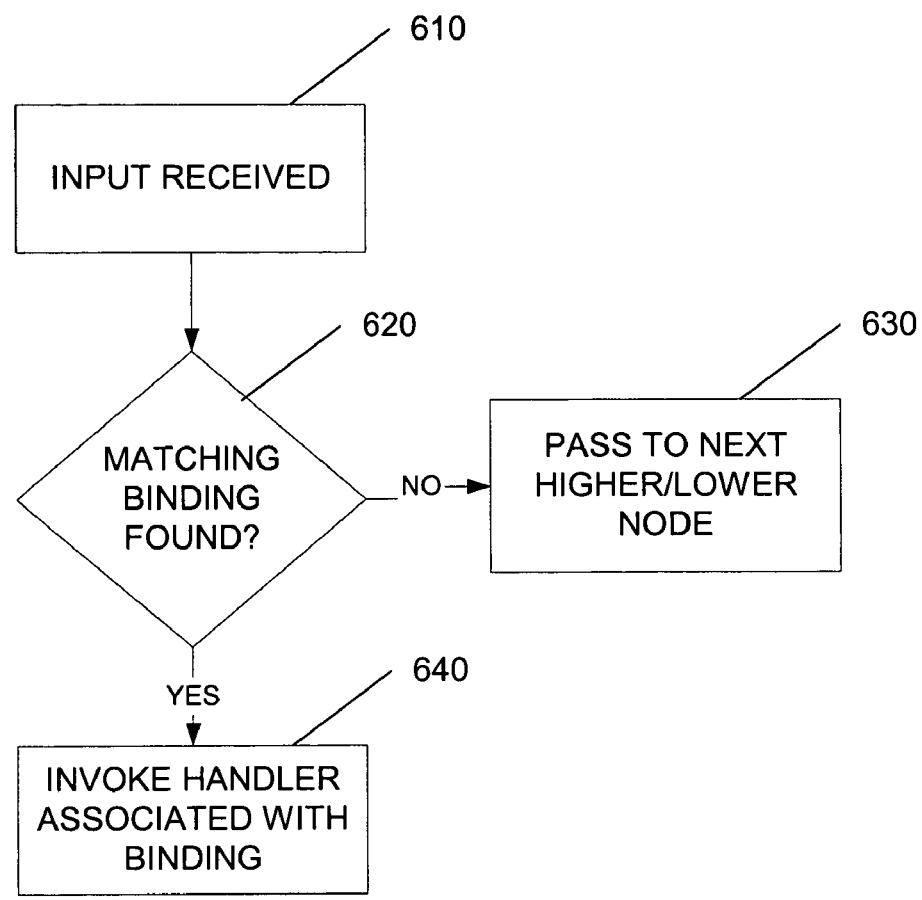
FIG. 6 illustrates an example flow diagram for implementing commanding according to an embodiment of the present invention.

Generally, an example of how commanding, or the connection of an input to action, is implemented is illustrated in FIG. 6. At operation 610, input is received from, for example, an input module of the computer system 100 configured to accept an input sequence from an input device. Next, at operation 620, the node receiving the input examines the binding table associated with the node to determine if the table includes a matching command binding. If a matching command binding is found, the command handler associated with the matching command binding is invoked at operation 640. Alternatively, if a matching command binding is not found in the node's binding table, control can be passed to operation 630, and the input is bubbled to the next higher node in tree 400, as described further below.

Referring again to FIGS. 3 and 4, as described above, when the user interface 300 receives an input sequence (e.g., from a user using an input device such as, for example, a keyboard or mouse), the binding table associated with that node that receives the input is traversed in an attempt to connect the input sequence to an action. In addition to traversing the binding table associated with the input, the input can also be forwarded to nodes in tree 400 that are parents and children to the node, and the binding tables associated with these parent and children nodes traversed as well in an attempt to connect the input sequence to an action.

In one possible embodiment, the input can be traversed through the tree 400 in two directions. Bubbling occurs when the tree 400 is traversed upward from a child to its parent, grandparent, etc. Conversely, tunneling occurs when the tree 400 is traversed downward from a parent to its child, grandchild, etc. As described further below, by bubbling and tunneling the input through nodes that are parents and children of the node that originally receives the input, additional and more flexible commanding functionality can be realized.

For example, referring again to FIGS. 3 and 4, assume that an input sequence is received at the text box 330 of the user interface 300. Node 430 in tree 400 represents the text box 330 implemented at the control level 220. When the input is received, the binding table 430a associated with the node 430 is examined in an attempt to match the input to a command binding in the table 430a. In addition, the input can be bubbled to the parent of node 430 in the tree 400, node 410, so that the binding table 410a associated with node 410 can be examined in an attempt to identify a matching command binding in the table 410a. Tunneling in the opposite direction can also be done if, for example, node 410 had a child node. In one possible embodiment, the input is tunneled down to a base node, and then bubbled up to the original node.

Figure 7:
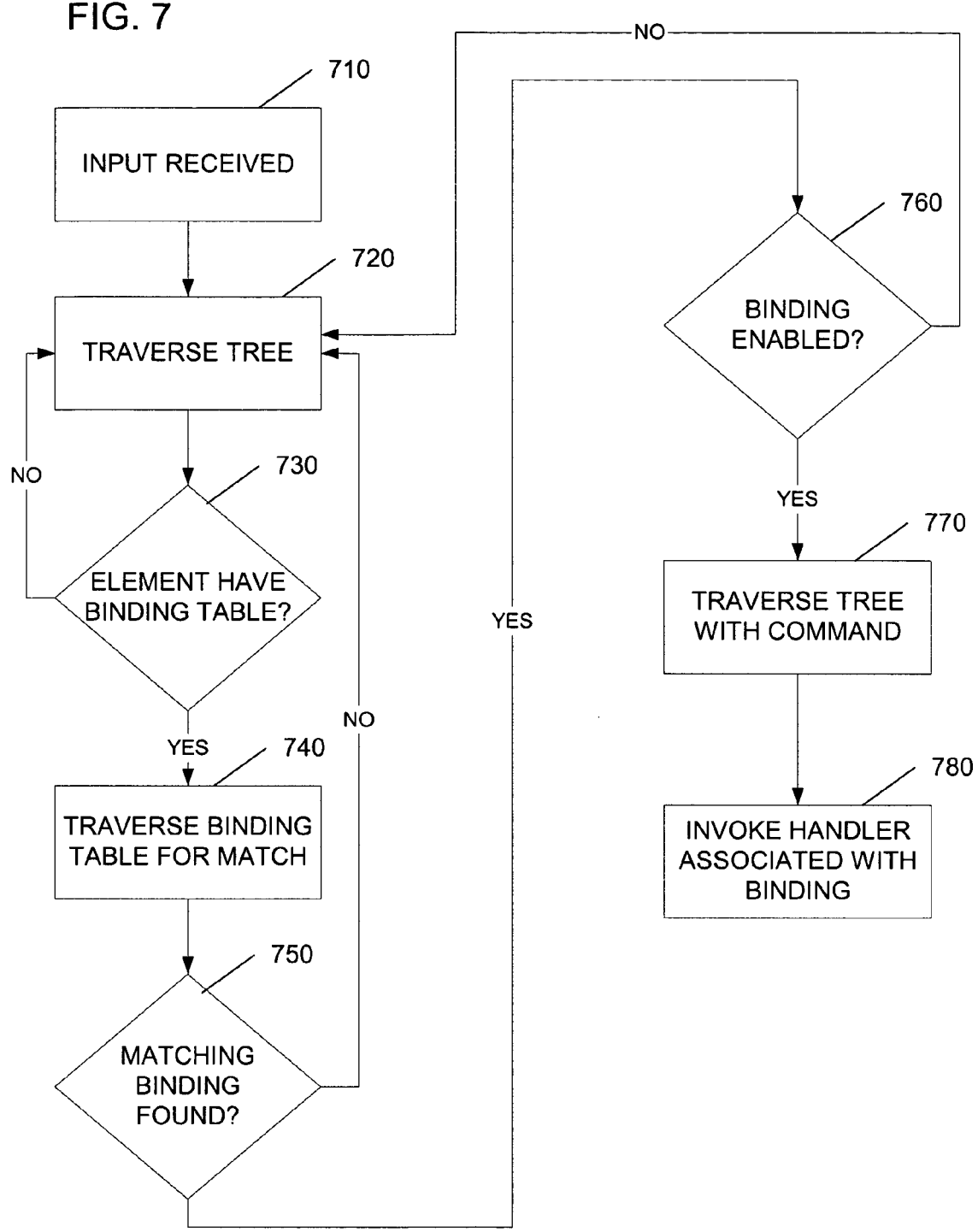
FIG. 7 illustrates another example flow diagram for implementing commanding according to an embodiment of the present invention.

In some example embodiments, the input sequence can be bubbled through the parent nodes in the tree 400 regardless of whether or not a particular node has a matching command binding in its binding table. For example, an embodiment of this operational flow is illustrated in FIG. 7. At operation 710, the input sequence is received. Beginning at operation 720, the input is traversed through tree 400 (e.g., bubbled and/or tunneled). The operation 720 begins at the node that has received the input. At operation 730, the node is checked to determine whether the node has a binding table associated with it (not all nodes may be associated with a binding table, as noted below).

If the node does not have an associated binding table, control is passed back to operation 720 and the input is bubbled or tunneled to the next parent or child node in the tree. If the node does have an associated binding table, the binding table is traversed at operation 740 to determine if the binding table has a command binding that matches the input sequence. At operation 750, if a matching command binding is not found in the table, control is passed back to operation 720 and the input is bubbled or tunneled to the next node in the tree.

If a matching command binding is found in the table, control is passed to operation 760, where it is determined whether or not the matching command binding is enabled. Binding entries within a binding table can be enabled or disabled depending on various factors surrounding commanding for the node. For example and without limitation, if the computer system 100 is not connected to a printer, binding entries in the binding table associated with printing can be disabled because such an action is not possible. If the matching command binding is not enabled, control is passed back to operation 720 and the input is bubbled or tunneled to the next node in the tree.

Enabling of commands can be implemented in several manners. For example, each entry in the binding table can have an enabled property associated with it to indicate whether or not the entry is enabled. In another embodiment, an additional handler can be associated with each binding entry so that, if an input sequence matches a specific entry, the handler invokes a section of code that is used to determine whether or not the entry is enabled. In another embodiment, the command associated with a matching binding entry can be tunneled and bubbled separately, as described below, so that another binding entry in the same or a different binding table can determine whether or not the entry is enabled.

If the matching command binding is enabled, the tree can be traversed (i.e., tunneled and bubbled) at operation 770 using the matching command associated with the matching command binding. Specifically, the tree can be traversed and each binding table examined to determine if any element has a specific command handler for the matching command.

There can be a variety of reasons why it may be desirable to traverse the tree a second time with the matching command. For example, a binding entry in a given binding table may provide a matching command binding and command, but may not include a command handler associated with the matching command. In this case, the matching command can be tunneled and bubbled in an attempt to find a matching command handler in a parent or child node. In another example, while a matching command in a binding table of a node may include an associated command handler, it is possible that a parent or child of the element may include a different "action" or command handler for a matching command. For example, although a matching command and command handler may be found in a binding table of a node, the node's parent may indicate that the matching command is not enabled and therefore the matching command handler should not be invoked. In another example, a binding table may not have a command binding for a particular input sequence, but may have a command handler for the command associated with the input sequence. Consequently, by bubbling and tunneling the command, a particular command can possibly be handled by a binding entry that does not have a matching command binding. Therefore, additional commanding information can be ascertained by bubbling and tunneling the matching command.

Finally, once the tree has been traversed with the matching command, at operation 780 the command handler associated with the matching binding entry is invoked to cause the action associated with the input sequence.

With reference again to FIGS. 4, 5, and 7, an operational flow illustrating how a specific input is handled is as follows. Initially, a copy "ctrl-c" input is received from the keyboard (operation 710) to copy text selected in text box 330 (corresponding to node 430). Next, the tree 400 is traversed, starting at node 430 (operation 720). Because node 430 has a binding table (operation 730), the binding table 430*a* is traversed to see if it has a matching command binding (operation 740).

Assuming that the binding table 430*a* of node 430 is table 500 illustrated in FIG. 5, binding entry 540 provides a matching command binding 540*a* (operation 750). Next, assuming the matching command binding 540*a* is enabled (operation 760), the matching command 540*b* associated with the matching command binding 540*a* is traversed through the tree 400 (operation 770). Assuming that none of the parent or children nodes to node 430 provide otherwise, the command handler 540*c* associated with the matching command 540*b* is then invoked and the selected text is copied to the clipboard (operation 780).

In this manner, the various nodes in the tree 400, which all represent features that are implemented at the control level, can accept an input sequence and connect the input to an action using the associated binding table. If a matching command binding is not found, the input can be bubbled to the next higher node in the tree 400, and its binding table can be examined for a matching command binding. In other words, if a given node of the tree 400 does not include a matching binding, one of its parents may include a matching binding which will allow the input to be connected to its given action.

This extension of commanding to the control level can allow for individual control elements so that specific control elements can be configured to handle input sequences as desired. Therefore, because the nodes of the tree 400 logically represent control elements (e.g., control elements 310, 320, and 330) in the control level, commanding can be provided in both the application level as well as control level of the computer system 100, thereby providing greater flexibility in commanding.

If conflicting information is contained with a given binding table, the conflict can be resolved in a number of manners. For example, in one embodiment, conflicting binding entries in a binding table are resolved using a "last entry wins" rule. For example, if two binding entries in a table match an input sequence, the last entry in the table dictates how the input sequence is handled. Other methods can also be used to handle conflicts such as, for example, a "first entry wins" rule.

In an alternative embodiment, multiplexed events can also be associated with a given node in the tree 400. For example, a multiplexed event can be associated with a node to specify that a particular command handler is to handle all input sequences passed to the node regardless of the type of input sequence. For example, a multiplexed event can be used when several commands have similar handling logic. In this manner, a single command handler can handle all inputs passed to the node.

In other alternative embodiments, binding entries in a binding table may not specify all properties for particular bindings. For example, a particular control element or application element can include a binding entry indicating that the element understands a particular command (e.g., "copy"), but the entry may not provide additional information regarding, for example, an input sequence or command handler associated with the command. This additional information can be ascertained, for example, through tunneling and bubbling.

In yet another alternative embodiment, information associated with input sequences received by a focus element (i.e., the element of a user interface that is currently in used by a user, or 305 of FIG. 3) can be forwarded to other control elements or application elements if the focus element cannot understand a given input sequence. For example, if a scroll bar is currently the focus element, and the user provides an input sequence of "ctrl-c," the nodes associated with the scroll bar may not be able to link the "copy" command associated with the input sequence to a specific action. However, the command can be "forwarded" to, for example, an adjacent node not in the direct lineage of the node which received the input. For example, this adjacent node can be associated with a text box that, while not a focus element, is currently open in the user interface. The copy command can be bubbled through the adjacent node's lineage and handled based on the commanding for the text box (i.e., the text box can include one or more bindings to handle the copy command). In this manner, commands that cannot be handled by the focus element may be handled by other control elements or application elements.

Although the example tree 400 and associated operational flow diagrams have been described with respect to a specific number of nodes in the tree 400, more or fewer nodes can also be provided depending on the number of control elements and application elements in a given user interface. In addition, not every node in a tree may include a binding table. For example, if a node receives an input sequence and does not have a binding table, the node can bubble and/or tunnel the input through the tree, and a parent or child can handle the input.

As previously noted, nodes in the tree 400 can correspond to elements in both the control level and the application level. In addition, although examples disclosed herein have focused on the copy command, the commanding systems and methods described herein can be configured to handle a variety of inputs from various input devices.

Additional details regarding alternative embodiments of the commanding systems described above can be found in U.S. patent application Ser. No. 10/717,307, entitled "Extension of Commanding to Control Level;" U.S. patent application Ser. No. 10/717,302, entitled "Attaching Services to Commanding Elements;" and U.S. patent application Ser. No. 10/717,195, entitled "Dynamically-Generated Commanding Interface," all of which are hereby incorporated by reference in their entireties.

Figure 8:
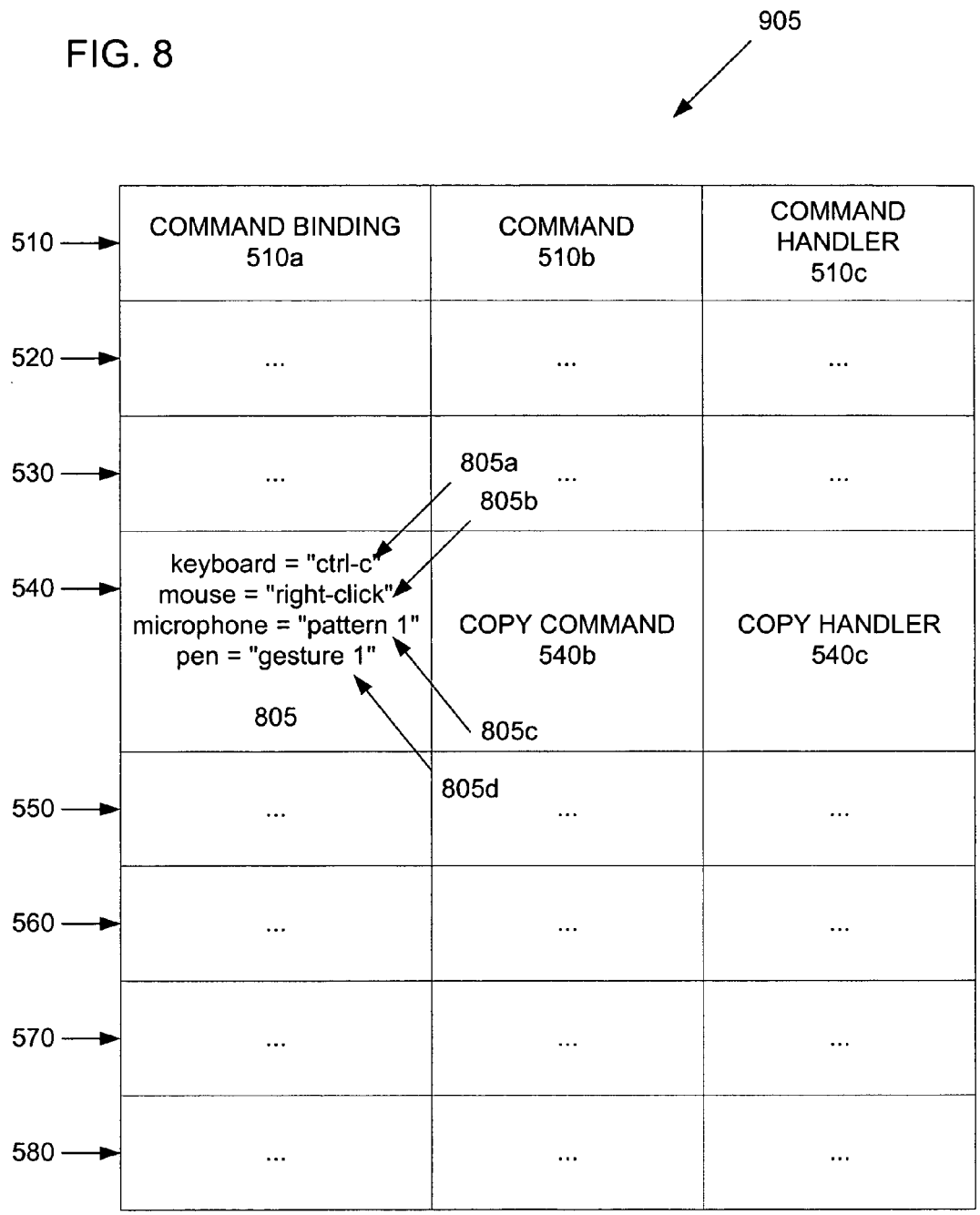
FIG. 8 illustrates another example binding table including a plurality of binding entries according to an embodiment of the present invention.

Referring now to FIG. 8, another possible embodiment of a binding table 905 is illustrated. Similar to the binding table 500 of FIG. 5, binding table 905 includes a command binding (e.g., 510*a*), a command (e.g., 510*b*), and a command handler (e.g., 510*c*) for each binding entry (e.g., 510).

In this embodiment, the binding entry 540 includes command binding 805, which has a plurality of sub-command bindings coded with entries for input sequences for multiple device categories. A device category is an input device that is used to provide an input sequence to the computer system, such as, for example and without limitation, a keyboard, a mouse, a microphone, a pen, a toolbar, and a menu. In the example shown, command binding 805 includes: sub-command binding 805*a* defining the input sequence ("ctrl-c") for the keyboard copy command; sub-command binding 805*b* defining the input sequence ("right-click") for the mouse copy command; sub-command binding 805*c* including the input sequence ("pattern 1") for the speech copy command; and sub-command binding 805*d* including the input sequence ("gesture 1 ") for the pen copy command.

In use, each sub-command binding of a specific binding entry can be traversed when attempting to match an input sequence to a matching command binding. In this manner, the binding entry 540 handles input sequences for the copy command that are created across different device categories (i.e., keyboard, mouse, microphone, and pen). In addition, because an input sequence from any of these devices is matched to a sub-command binding in binding entry 540, only a single copy command handler 540*c* is provided to invoke the copy action. Therefore, input sequences from multiple device categories for the same command can be handled consistently by a single handler.

In addition to providing the ability to define multiple sub-command bindings for an entry in a binding table, binding entries for new input devices can be developed so that new properties can be added, as well as the logic for mapping input sequences from the input device to the appropriate action. For example, a binding entry for a new input device can define a sub-binding entry that handles the input sequence for the new input device.

New sub-bindings with properties for new input devices can be added to application elements at the application level without requiring a change to the control level. For example, new sub-bindings for new input devices can be added to binding tables associated with an application element. Input sequences from those new input devices can thereby be handled by bubbling the input sequences from an element in the control level to the application element that is associated with the binding table with the appropriate sub-binding to handle the new input.

In other alternative embodiments, a binding table can be a "heterogeneous" binding table. In this type of table, different binding entries within a given binding table can have different properties and therefore a different number of columns for each binding entry. For example, as noted above, sub-command bindings can be added for additional properties associated with a given entry to extend the number of columns in a binding table.

In other embodiments, each binding can be limited to a single command binding. In yet other embodiments, bindings related to different input devices can be listed in separate binding tables. For example separate binding tables can be provided for keystroke bindings and another binding table for speech bindings.

Figure 9:
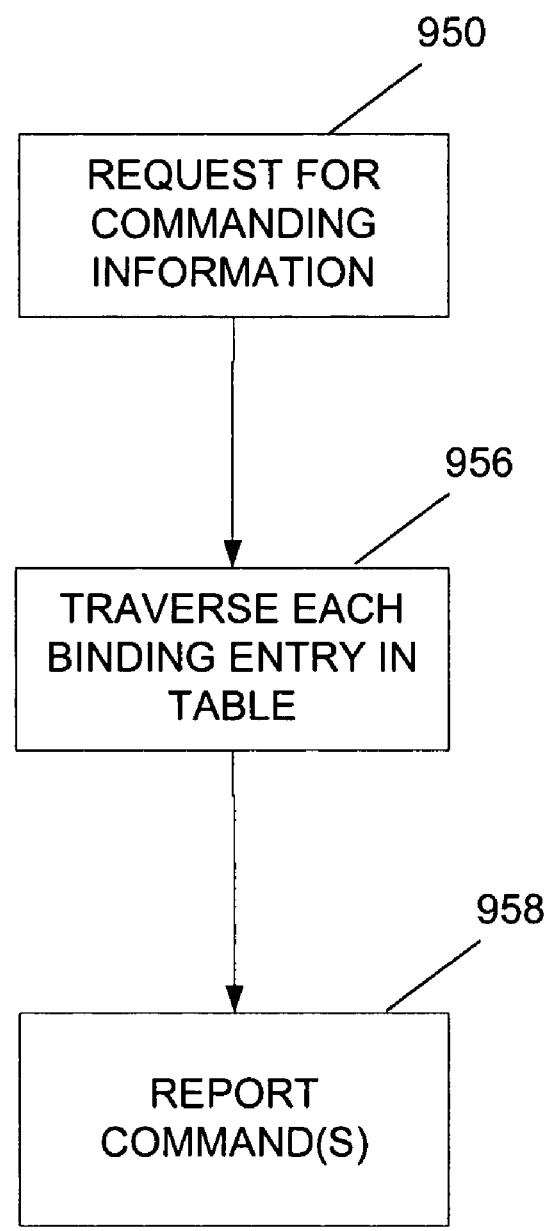
FIG. 9 illustrates an example flow diagram for reporting the command bindings recognized by an application according to an embodiment of the present invention.

Referring now to FIG. 9, a flow diagram is provided illustrating how an application can identify and report particular commands the application understands. In this method, an application traverses its binding table to identify the commands associated with commands the application can accept. The application can also traverse the commanding tree (e.g., tree 400 in FIG. 4) associated with the application so that commanding information from parent nodes can also be reported.

In an example, a request for the command bindings associated with an application is made at operation 950. This request can be generated in a variety of contexts. For instance, another application such as, for example, an accessibility tool or speech processor, can request that a target application identify the commands it understands. The request can take the form of a routine that traverses the commanding tree of the target application and reports back to the requesting application with the commands the target application can understand.

At operation 956, each binding entry in the binding table of the target application is traversed to identify all commands in the binding table. For example, if the binding table 905 represents the binding table for the target application, the binding table is traversed and the copy command 540*b* is identified. Once identified, the copy command 540*b* is reported back to the requesting application at operation 958. The requesting application can thereby know that the target application understands the copy command.

The method illustrated in FIG. 9 can be used in a variety of contexts. For example, an accessibility tool's ability to query another application to ascertain the application's commanding information can be advantageous. For example, an accessibility tool for the visually-impaired can query an application as illustrated by the method of FIG. 9 and report the commands understood by the application to a visually-impaired user using an unconventional output such as a speech synthesizer.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A commanding system for a computer, comprising:
a memory storing an input module that accepts a plurality of input sequences across multiple input device categories, and a commanding element at an application level having a binding table that connects input to associated action, at least one binding entry in the binding table including sub-command bindings associated with the plurality of input sequences across multiple input device categories, and the memory further comprises a second commanding element at a control level or an operating system level having a second binding table that connects input to associated action, at least one binding entry in the second binding table including sub-command bindings associated with the plurality of input sequences across multiple input device categories; and
a processor in data communication with the memory, the processor programmed to:
  receive the input at the input module;
  pass the input to the commanding element at the application level, the commanding element looking up a matching sub-command binding associated with the input in the binding table;
  tunnel the input to the second commanding element at the control level or the operating system level, the second commanding element looking up the matching sub-command binding associated with the input in the second binding table; and
  invoke action connected with the input if the matching sub-command binding is found in the binding table or the second binding table.

2. The system of claim 1, wherein at least two of the plurality of input sequences from the multiple input devices are selected from the group consisting of a keyboard, mouse, pen, and microphone.

3. The system of claim 1, wherein the listing of the command bindings includes entries for a keyboard, a mouse, a pen, and a microphone.

4. The system of claim 1, wherein the processor is further programmed to:
traverse the binding table; and
report a command associated with each binding entry of the binding table.

5. A method for commanding a computer system, comprising:
receiving one of a plurality of input sequences generated by different input device categories;
passing the input sequence to a commanding element;
looking up a matching binding entry associated with the input sequence in a binding table, the matching binding entry including a plurality of sub-command bindings for the different input devices;
invoking a handler associated the input if the matching binding is found in the binding table;
receiving a request to report commanding information;
traversing the binding table;
reporting each command in each entry of the binding table;
passing the input sequence to a second commanding element;
looking up the matching binding entry associated with the input sequence in a second binding table associated with the second commanding element, the matching binding entry including a plurality of sub-command bindings for the different input devices; and
invoking a handler associated the input if the matching binding is found in the second binding table.

6. The method of claim 5, wherein the different input device categories include at least two selected from the group consisting of a keyboard, a mouse, a pen, and a microphone.

7. The method of claim 5, wherein the different input device categories include a keyboard, a mouse, a pen, and a microphone.

* * * * *